United States Patent [19]

Shimanuki

[11] Patent Number: 4,982,149
[45] Date of Patent: Jan. 1, 1991

[54] ELECTRIC SUPPLY APPARATUS HAVING MEANS FOR CORRECTING SUPPLY VOLTAGE FLUCTUATIONS

[75] Inventor: Masanobu Shimanuki, Yokohama, Japan

[73] Assignee: Kabushiki Kaisha Toshiba, Kawasaki, Japan

[21] Appl. No.: 462,594

[22] Filed: Jan. 9, 1990

[30] Foreign Application Priority Data

Jan. 11, 1989 [JP] Japan .................................. 1-3992

[51] Int. Cl.$^5$ ............................................. G05F 1/571
[52] U.S. Cl. ..................................... 323/274; 323/276; 307/64; 307/66; 361/18
[58] Field of Search .................... 307/64, 66; 323/273, 323/274, 275, 276; 361/18

[56] References Cited

U.S. PATENT DOCUMENTS

| | | | |
|---|---|---|---|
| 3,409,803 | 11/1968 | DeWitt | 361/18 |
| 3,703,679 | 11/1972 | Heidt | 361/18 |
| 3,796,919 | 3/1974 | Johnson | 323/276 |
| 3,809,999 | 5/1974 | Smith | 361/18 |
| 3,886,410 | 5/1975 | Seer | 323/276 |
| 3,988,643 | 10/1976 | Morris | 361/18 |
| 4,013,925 | 3/1977 | Tice et al. | 361/18 |
| 4,327,298 | 4/1982 | Burgin | 307/66 |
| 4,342,922 | 8/1982 | DiMassimo et al. | 307/66 |
| 4,354,118 | 10/1982 | Spencer | 307/66 |
| 4,528,549 | 7/1985 | Wiegel | 307/66 |
| 4,672,502 | 6/1987 | Reichart | 323/276 |
| 4,694,194 | 9/1987 | Hansel et al. | 307/64 |
| 4,841,219 | 6/1989 | Lonergan | 323/274 |

Primary Examiner—Steven L. Stephan
Assistant Examiner—Jeffrey Sterrett
Attorney, Agent, or Firm—Foley & Lardner, Schwartz, Jeffery, Schwaab, Mack, Blumenthal & Evans

[57] ABSTRACT

Power supply equipment which comprises a power supply circuit (9) that supplies power to a load, a regulator circuit connected to the power supply circuit that regulates the output voltage of the power supply circuit at a predetermined voltage level, a regulator circuit control means that controls voltage in proportion to the output voltage of the power supply circuit to the regulator circuit, and an overload detection means that detects if the load is in overload condition, so that in response to overload detection by the overload detection means the regulator circuit control means controls the regulator circuit (13) to stop power feed to the load from the power supply circuit.

4 Claims, 2 Drawing Sheets

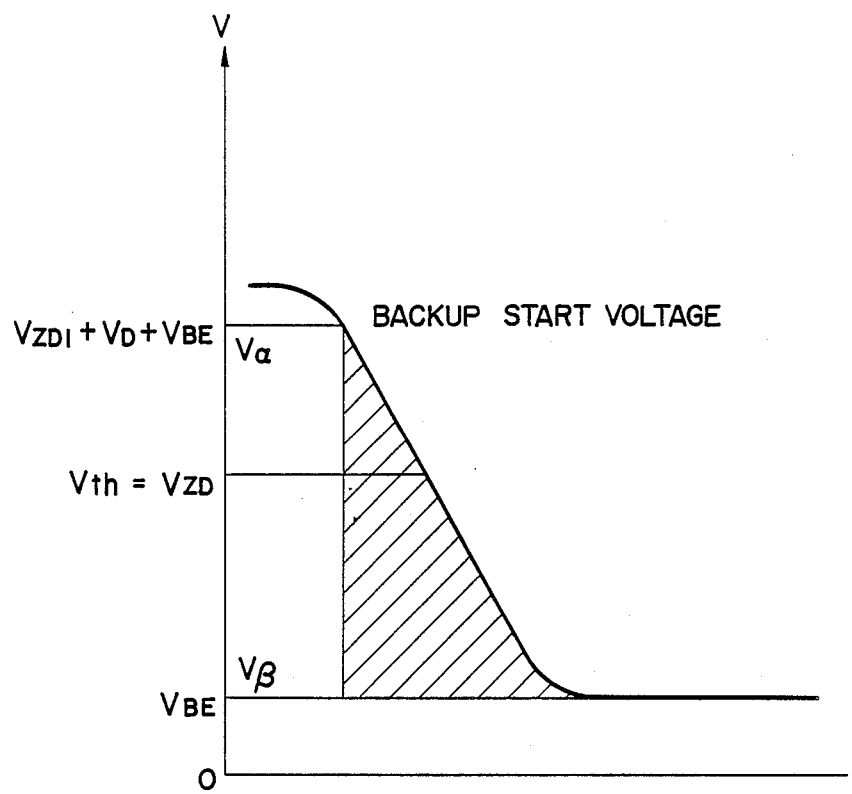
F I G. 3

4,982,149

ELECTRIC SUPPLY APPARATUS HAVING MEANS FOR CORRECTING SUPPLY VOLTAGE FLUCTUATIONS

BACKGROUND OF THE INVENTION

This invention relates to the electric power supply equipment and method which supply stable a constant voltage power to a load.

As is well known, some electric power supply equipment, includes a circuit for detecting abnormalities in load, and restricts the load current for protection of the circuit. Other circuits detects the power failure and switch the electric power supply to a backup power source.

Formerly, for protecting the circuit against excessive loading, as mentioned above, various heat-sensitive resistance devices such as thermisters, posistors, current limiters and thermal shut-downs were used. Because of lack of quick responsiveness, these heat-sensitive resistance devices cannot limit the output current readily in abnormal incidents, such as load short-circuit, and may, therefore, damage circuit devices in power failure detector circuits, regulators and other circuits, thus causing insulation deterioration, the breaking of primary windings, the destruction of rectifier circuits and so on.

Furthermore, because of wide dispersion in their characteristics, heat-sensitive resistance devices create problems in setting arbitrarily and accurately the detection threshold values for detecting load abnormalities.

Further, with conventional power supply equipment the cost becomes high due to the need for many parts, since the failure detection circuit is provided separately from other circuits, such as a regulator.

SUMMARY OF THE INVENTION

The first object of this invention is to protect the circuit devices adequately by breaking the output with good response in case any abnormalities in the load occur due to the electric power supply equipment. The second object of this invention is to make it possible to set up the threshold level arbitrarily and accurately in order to detect the abnormalities in a load. The third object of the invention is to provide electric power supply equipment of a simple structure and low cost by the common use of a part of power failure detecting circuit with other circuit parts.

The first aspect of this invention is to provide power supply equipment which comprises a power supply circuit that supplies power to a load, a regulator circuit connected to the power supply circuit that regulates the output voltage of the power supply circuit at a predetermined voltage level, a regulator circuit control means that controls voltage in proportion to the output voltage of the power supply circuit to the regulator circuit, and an overload detection means that detects the load is in overload condition, so that in response to overload detection by the overload detection means the regulator circuit control means controls the regulator circuit to stop feeding power to the load from the power supply circuit.

The second aspect of this invention is to provide power supply equipment which comprises a power supply circuit that supplies power to a load, a regulator circuit connected to the power supply circuit that regulates the output voltage of the power supply circuit at a predetermined voltage level, a regulator circuit control means that controls voltage in proportion to the output voltage of the power supply circuit to the regulator circuit, a power failure detection means that detects power failure during voltage regulation operation of the regulator circuit, and which outputs a power failure detection signal, a switch means that connects a backup power supply to the load at a power failure, and a backup control circuit that controls the switch in response to the power failure detection signal from the power failure detection means, so that in case of power failure of the power supply circuit, power is fed from the backup power supply to the load.

The third aspect of this invention is to provide power supply equipment which comprises a power supply circuit that supplies power to a load, a regulator circuit connected to the power supply circuit that regulates the output voltage of the power supply circuit at a predetermined voltage level, a regulator circuit control means that controls voltage in proportion to the output voltage of the power supply circuit to the regulator circuit, a power failure detection means that detects power failure during voltage regulation operation of the regulator circuit, and which outputs a power failure detection signal, a switch means that connects a backup power supply to the load at a power failure, an overload detection means that detects when the load is in an overload condition, and a backup control circuit that controls the switch in response to the power failure detection signal from the power failure detection means, so that, in case of power failure of the power supply circuit, power is fed from a backup power supply, and that when the load is in overload condition, the power feed from the power supply circuit and the backup power supply to the load is stopped.

The fourth aspect of this invention is to provide a method of supplying power to a load which comprises a step that regulates the output voltage of a power supply circuit at a predetermined voltage level to supply power to the load, a step that detects power failure of the power supply circuit, a step that detects that the load is in an overload condition, a step that feeds power from a backup power supply to the load in case of power failure of the power supply circuit, and a step that stops the power feed from the power supply circuit and the backup power supply when the load is in an overload condition.

BRIEF DESCRIPTION OF THE DRAWINGS

FIG. 3 is an explanatory diagram of the load abnormality detecting operation of the embodiment in FIG. 2.

DESCRIPTION OF THE PREFERRED EMBODIMENT

Figure 1:
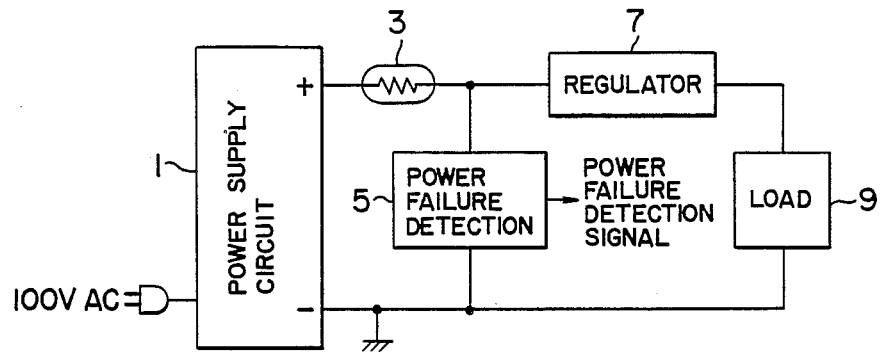
FIG. 1 is a block diagram showing an example of the electric power supply equipment according to the prior art.

FIG. 1 is a block diagram showing an example of the electric power supply equipment according to the prior art. In this piece of electric power supply equipment, a posistor (i.e., a heat-sensitive resistance device with a positive temperature coefficient) is used, and in case of an abnormality incident such as a short-circuit in the load 9, heat is generated due to the increased current, which works to increase the electric resistance so that the current inflow from the side of the power supply circuit 1 is restricted. Thereby, accidents such as the damage on the step-down transformer, rectifying circuit and smoothing circuit which constitute the circuit 1 as well as that on the power failure detector circuit 5 and regulator 7 can be prevented.

Further, a power failure detector circuit 5 which detects the power failure of the 1 side of the power supply circuit is provided. Should the output voltage of the circuit 1 fall below the threshold, a power failure detection signal is sent out to switch the power feed to a backup power source such as a battery (not shown in the figure).

In this conventional equipment, a heat-sensitive resistance device such as a posistor 3 has been used as a means of protecting the circuit in case of load abnormality. However, because the heat-sensitive resistance device takes advantage of the change of resistance due to heat generation, it lacks quick responsiveness. In the event of a short-circuit of load 9, therefore, the conventional equipment cannot restrict the output current instantly, thus sometimes causing the damage of some devices within the power-failure detection circuit 3, regulator 7, along with the insulation deterioration and breakage of the transformer primary-winding which forms the circuit 1, the damage of the rectifying circuit, and so forth. Further, because of the characteristics of the heat-sensitive resistance devices, there is also a difficulty in setting up the detection threshold for accurately detecting a load abnormality. Further, since the power failure detection circuit, 5 is provided as a separate circuit independent of other parts of the equipment, such as regulator 7, the parts incorporated becomes numerous, thus causing a problem of high cost.

Figure 2:
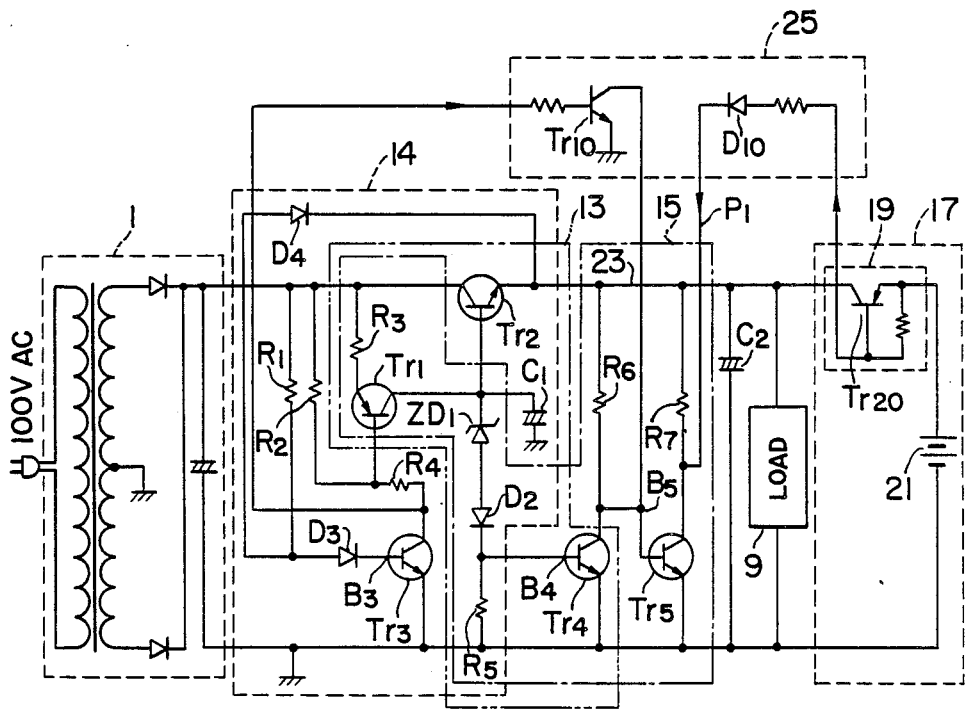
FIG. 2 is a circuit diagram showing an actual example of the electric power supply equipment embodying this invention.

FIG. 2 is a circuit configuration diagram of the electric power supply equipment showing an embodiment of this invention. This electric power supply apparatus is composed of the power supply circuit 1, regulator circuit 13, load abnormality protection circuit 14, power failure detecting circuit 15 and backup power source circuit 17, and the output terminals of regulator circuit 13 and backup power source circuit 17 are connected to load 9.

Further, the foregoing configuration is detailed below. Provided with a voltage step-down transformer, a rectified circuit, and a smoothing circuit (an illustration is omitted), the power supply circuit 1 is used to convert, for example, a received 100V AC into a roughly constant DC voltage. The regulator circuit 13 is the section enclosed with alternate long and short double dash lines in FIG. 2. In this circuit, to the output terminal on the plus side of circuit 1, is connected, via the resistor $R_3$ and transistor $Tr_1$, the cathode of a Zener diode $ZD_1$—a constant-voltage drop device for determining the regulator voltage. The anode of this Zener diode $ZD_1$ is connected, via diode $D_2$ and transistor $Tr_4$ (between its base and emitter), to the output terminal (ground) on the minus side of the power supply circuit 1. As described later, $Tr_1$ and $Tr_4$ are kept ON in the normal operation. Consequently, on the cathode of Zener diode $ZD_1$, there appears the voltage obtained by adding its Zener voltage $V_{ZD1}$, the forward-direction voltage drop $V_D$ of diode $D_2$ (approximately 0.6V) and the voltage $V_{BE}$ between the base and emitter of transistor $Tr_4$ (approximately 0.6V) together, that is, $$V_{ZD1}+V_D+V_{BE}$$

The cathode of the Zener diode $ZD_1$ is connected, via the base and emitter of transistor $Tr_2$, to the plus side of the output line 23. Consequently, on the output line 23, there appears a voltage that is obtained by subtracting, from the foregoing cathode voltage, the voltage $V_{BE}$ between the base and emitter of transistor $Tr_2$, viz:

$$V_{ZD1}+V_D$$

This is the regulator voltage. The load abnormality protection circuit 14 is the section enclosed by broken lines in FIG. 2. In this circuit, the base of the emitter-grounded transistor $Tr_3$ is connected to the plus side of the output terminal of the voltage step-down, rectifying and smoothing circuit, via the current limiter resistor $R_1$ and diode $D_3$—a constant voltage step-down means. The collector of the transistor $Tr_3$ is connected, via the voltage divider resistors $R_2$ and $R_4$, to the plus-side of the output terminal of circuit 1, and the junction of the voltage divider resistors $R_2$ and $R_4$ is connected to the base of transistor $Tr_1$. The emitter of the transistor $Tr_1$ is connected via a current limiter $R_3$ to the plus side of the output terminal of the circuit 1, and as mentioned above, its collector is connected to the base of transistor $Tr_2$. The transistors $Tr_3$, $Tr_1$ and $Tr_2$ constitute a switch to cut off the power feed to the load in case of a load abnormality, and to the base $B_3$ of the transistor $Tr_3$ is impressed the voltage for controlling this switch. The emitter of the transistor $Tr_2$ is connected via a reverse-direction diode and a forward-direction diode to the base of the transistor $Tr_3$. When the output of the power supply circuit 1 is in $(V_D+V_{BE})$ state, the transistor is set to ON condition. At this time, a low voltage determined roughly by the voltage ratio of resistors $R_2$ and $R_4$ is applied to the base of transistor $Tr_1$, thus setting the transistor $Tr_1$ to ON condition. Consequently, as mentioned above, the cathode voltage of Zener diode $ZD_1$ is applied to the base of transistor $Tr_2$, thus setting the transistor $Tr_2$ to ON status, and on its emitter, that is, the output line 23, the regulator voltage $V_{ZD1}+V_D$, as aforementioned, appears. Since, at this time, the anode voltage of diode $D_3$ is $V_{BE}+V_D$, and diode $D_4$ in a reverse-blocking state, the regulator voltage in normal operation does not affect the ON condition of the transistor $Tr_3$. When the voltage of the output line 23 drops due to an abnormality incident such as a short-circuit in the load 9 even if the power supply circuit 1 is normal, the diode $D_4$ turns ON at the moment when that voltage value falls below the foregoing anode voltage minus the forward-direction voltage drop $V_D$ of the diode $D_4$, i.e., $V_{BE}$, making the base voltage of transistor $Tr_3$ lower than the voltage $V_{BE}$ between the base and emitter, so that the transistor $Tr_3$ turns OFF. Thus, because the base voltage of the transistor $Tr_1$ is raised roughly to the output voltage of the circuit 1, the transistor $Tr_1$ turns OFF, thereby reducing the base voltage of transistor $Tr_2$ pursuant to the discharge of the ripple-removing capacitor $C_1$, and turning OFF the transistor $Tr_2$ instantly to cut off the power supply to the load 9. FIG. 3 shows this condition, and at the moment when the output voltage falls to the voltage $V_{BE}$ between the base and emitter of transistor $Tr_3$, the power feed is cut-off. In short, the load abnormality detecting threshold value is $V_{BE}$ in this embodiment. If it is desired to set the detecting threshold to a higher level, for example, Vth in FIG. 3, the diode $D_3$ should be replaced with a Zener diode. In this case, let the Zener voltage of the Zener diode be $V_{ZD}$, then the threshold value Vth is:

$$Vth = V_{ZD} + V_{BE} - V_D = V_{ZD}$$

Detailed operations at load abnormality are described later. Operations in case of power failure when the power supply circuit loses its feed function are described here.

The power failure detection circuit 15 is the section enclosed with a dot chain line in FIG. 2. This circuit includes a transistor $Tr_4$, whose emitter and whose collector is connected with the output line 23 via resistor $R_6$ and a transistor $Tr_5$, whose base is connected to the collector of transistor $Tr_4$, whose emitter is grounded and whose collector is connected to the output line 23 via resistor $R_6$. When the power feed capacity of the power supply circuit 1 falls and the voltage applied to the base $B_4$ of the transistor $Tr_4$ falls below the voltage $V_{BE}$ between the base and emitter, the transistor $Tr_4$ turns OFF and the transistor $Tr_5$ turns ON, and the power failure detection signal $P_1$ roughly equal to the ground level is output from the collector of transistor $Tr_5$. To the base $B_4$ of transistor $Tr_4$, the output voltage of the power supply circuit 1 is applied via the resistor $R_3$, transistor $Tr_1$, Zener diode ZD which serves as a secondary constant-voltage step-down means, and diode $D_2$. In normal operation, the base voltage of transistor $Tr_4$ takes a value equal to the voltage $V_{BE}$ between the base and emitter, and the power failure detection signal is not output. Should a power failure occurs on the side of power supply circuit 1, the output drops, and when it falls below the sum of the Zener voltage $V_{ZD1}$ of Zener diode $ZD_1$, the forward voltage drop $V_D$ of diode $D_2$ and the voltage $V_{BE}$ between the base and emitter of transistor $Tr_4$, viz:

$$V_{ZD1} + V_D + V_{BE},$$

the transistor $Tr_4$ turns OFF, and the power failure detection signal $P_1$ is output. Thus, in the power failure detection circuit 15, the constant-voltage drop devices $ZD_1$ and $D_2$ for determining the power failure detection threshold are used in common with the constant voltage drop devices $ZD_1$ and $D_2$ for determining the regulating voltage of the regulator circuit 13. The backup power circuit 17, a section enclosed with a broken line in FIG. 1, has a battery 21 and a switch 19 for connecting the battery 21 to the load 9. For this switch 19, for example, a transistor $Tr_{20}$ which is made to turn ON by means of the power failure detection signal $P_1$ is used. The power failure detection signal $P_1$ is given to the backup control circuit 25. The backup control circuit 25 turns the diode $D_{10}$ ON by the power failure detection signal $P_1$ (being at approximately grounding potential), thus turning on the transistor $Tr_{20}$ of the switch 19. Backup operation by the battery 21 to the load 9 starts when turning ON the transistor $Tr_{20}$ makes the power supply voltage of the power supply circuit 1 fall below $V_{ZD1} + V_D + V_{BE}$ (potential $V_2$ in FIG. 3). The backup operation continues until the battery 2 is consumed since a bias is supplied via the resistor $R_6$ to the transistor $Tr_5$ because the transistor $Tr_{20}$ of the switch 19 has been already turned ON even after power feed capacity of the power supply circuit 1 is lost.

When the power feed capacity of the power supply circuit 1 is recovered, the transistor $Tr_3$ first turns ON and then the transistors $Tr_1$, $Tr_2$, and $Tr_4$ turn ON, thus feeding power via the power supply circuit 1 to the load 9. When the transistor $Tr_4$ turns ON, the transistor $Tr_{10}$, which consitutes the backup control circuit 25, turns ON and forcibly turns the transistor $Tr_5$ OFF, thus stopping the backup operation by turning the transistor $Tr_{20}$ OFF.

The operation of the invention when the terminal voltage of the load 9 in an overload condition drops by any cause is described below.

For protection against the power supply circuit 1 and from such a viewpoint that continuation of power feed to the load 9 may damage the load itself, it is necessary to prohibit power supply both by the power supply circuit 1 and by the backup power supply 21.

In this invention overload detection is performed by switching operation of the transistor $Tr_3$ to which the emitter potential of the transistor $Tr_2$ is applied via diodes $D_4$ and $D_3$ to the base of the transistor $Tr_3$. Namely, when in overload condition the voltage across the terminals of the load 9 drops to $V_O$ (potential $V_B$ in FIG. 3), the emitter potential of the transistor $Tr_2$ becomes $V_D$, and the diode $D_4$ turns ON, turning transistor $Tr_2$ OFF by turning the transistor $Tr_3$ forcibly OFF, thus stopping power supply to the load 9 from the power supply circuit 1. Further, in overload condition, the overload is detected by ON condition of the diode $D_4$, turning the transistor $Tr_3$ OFF. As a result the transistor $Tr_{10}$ of the backup control circuit 25 turns ON, and the transistor $Tr_5$ OFF, thus the transistor $Tr_{20}$ which constitutes the switch 19 turns OFF, thereby stopping power supply from the backup power supply 21 to the load 9. That is, in overload condition, no power is supplied to the load 9 from either the backup power supply 21 or the power supply circuit 1.

As described above, this invention provides the power supply equipment which backs up the load by a backup power supply in case of power failure and stops the power feed by both the backup power supply and the power supply circuit when in overload condition, thus enabling proper backup as well as protection against overload.

What is claimed is:
1. An electric power supply apparatus, comprising:
   (a) a power supply circuit for supplying power to a load;
   (b) a control transistor having a collector-emitter current path connected between said power supply circuit and the load, and a base side connected to a constant voltage circuit composed of series-connected constant voltage drop devices and a resistor to generate a reference voltage, for controlling voltage to be supplied to the load;
   (c) voltage fluctuation detecting means, which means are turned on or off in response to voltage fluctuations across the resistor;

(d) a backup power supply for subsidiarily supplying power to the load when supply voltage from said power supply circuit drops; and
(e) switching means connected between said backup power supply and the load for starting a subsidiary power supply from said backup power supply to the load in response to a switching operation of said voltage fluctuation detecting means;
whereby voltage across said resistor which constitutes the constant voltage circuit for generating the reference voltage is used in common as a detection voltage for turning on or off said voltage fluctuation detecting means.

2. An electric power supply apparatus, comprising:
(a) a power supply circuit for supplying power to a load;
(b) a control transistor having a collector-emitter current path connected between said power supply circuit and the load, and a base connected to a constant voltage circuit composed of series-connected constant voltage drop devices and a resistor to generate a reference voltage, for controlling voltage to be supplied to the load;
(c) voltage fluctuation detecting means turned on or off in response to voltage fluctuations across the resistor;
(d) a backup power supply for subsidiarily supplying power to the load when supply voltage from said power supply circuit drops;
(e) switching means connected between said backup power supply and the load, for starting a subsidiary power supply from said backup power-supply to the load in response to a switching operation of said voltage fluctuation detecting means;
(f) overload detecting means for detecting whether voltage across the load drops below a predetermined voltage when power is supplied from said backup power supply to the load; and
(g) power supply stopping means for turning off said control transistor and said switching means when said overload detecting means detects that voltage across the load drops below the predetermined voltage;
whereby power supply to the load is stopped when voltage across the load drops below the predetermined voltage.

3. The electric power supply apparatus of claim 2, wherein said overload detecting means comprises a detection transistor having a base responsive to voltage across the load via a second constant voltage drop device for detecting whether the voltage across the load drops below the predetermined voltage, whereby the predetermined voltage can be determined on the basis of characteristics of said second constant voltage drop device.

4. An electric power supply apparatus, comprising:
(a) a power supply circuit for supplying power to a load;
(b) a control transistor having a collector-emitter current path connected between said power supply circuit and the load, and a base whose voltage is controlled in response to supply voltage to the load, for controlling voltage to be supplied to the load;
(c) a backup power supply for subsidiarily supplying power to the load when supply voltage from said power supply circuit drops;
(d) switching means connected between said backup power supply and the load, for starting and stopping subsidiary power supply from said backup power supply to the load;
(e) a detection transistor having a base responsive to voltage across the load via a constant voltage drop device when power is being supplied from said backup power supply to the load, for detecting whether the voltage across the load drops below a voltage value determined on the basis of characteristics of said constant voltage drop device; and
(f) power supply stopping means for turning off said control transistor and said switching means when said detection transistor detects that the voltage across the load drops below the voltage value;
whereby power supply to the load is stopped when voltage across the load drops below the voltage value determined on the basis of characteristics of said constant voltage drop device.

* * * * *